US006999654B1

(12) United States Patent
Egnell et al.

(10) Patent No.: US 6,999,654 B1
(45) Date of Patent: Feb. 14, 2006

(54) CONNECTION OF ON AN ADD/DROP NODE

(75) Inventors: Lars Egnell, Stockholm (SE); Bengt Johansson, Stockholm (SE); Fredrik Liden, Stockholm (SE); Fredrik Lindgren, Stockholm (SE); Dag Bonnedal, Stockholm (SE); Ola Hulten, Stockholm (SE)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 10/089,112

(22) PCT Filed: Sep. 27, 2000

(86) PCT No.: PCT/SE00/01877

§ 371 (c)(1),
(2), (4) Date: Jun. 24, 2002

(87) PCT Pub. No.: WO01/24432

PCT Pub. Date: Apr. 5, 2001

(30) Foreign Application Priority Data

Sep. 27, 1999 (SE) .................................... 9903521

(51) Int. Cl.
*G02B 6/28* (2006.01)
*H04J 14/02* (2006.01)

(52) U.S. Cl. .......................................... 385/24; 398/83
(58) Field of Classification Search ................. 385/15, 385/24, 39, 42; 398/59, 82, 83, 84, 85, 4
See application file for complete search history.

(56) References Cited

U.S. PATENT DOCUMENTS 5,680,235 A    10/1997   Johansson ................... 359/110

(Continued)

FOREIGN PATENT DOCUMENTS

EP          0920153 A2       6/1999

(Continued)

OTHER PUBLICATIONS

Zhong, "New Bi-Directional WDM Ring Networks with Dual Hub Nodes", IEEE, 1997, vol. 1, pp. 556-560.*

(Continued)

*Primary Examiner*—Edward J. Glick
*Assistant Examiner*—Chih-Cheng Glen Kao
(74) *Attorney, Agent, or Firm*—Aka Chan LLP

(57) ABSTRACT

An add/drop node of an optical WDN-network which has two fiber paths for light of a plurality of channels propagating in opposite directions comprises two add/drop modules (23l, 23r) for each of the channels. All the modules are identically constructed. Each module comprises an add device (25l, 25r) for adding light to one of the paths and a drop device (27r, 27l) for deflecting a portion of light from a second one of the paths. A module comprises a house (41) enclosing the add device and the drop device. A first fixed connector (53, 73) is attached to the house for connection in the first path and to a an optical fiber (45, 65) which extends freely from the house and has a first free connector (43, 63) at its free end to be attached to the fixed connector of a neighboring add/drop module for continuing the first path through the considered add/drop module to the neighboring module. In the same way a second fixed connector is attached to the house for connection in the second path and to a second optical fiber which extends freely from the house and has a second free connector at its free end to be attached to the fixed second connector of a neighboring add/drop module for continuing the second path through the considered add/drop module to the neighboring module.

11 Claims, 5 Drawing Sheets

U.S. PATENT DOCUMENTS

| | | | |
|---|---|---|---|
| 5,754,545 A | 5/1998 | Shinbashi et al. | |
| 5,774,606 A | 6/1998 | De Barros et al. | |
| 5,778,132 A * | 7/1998 | Csipkes et al. | 385/135 |
| 5,832,156 A * | 11/1998 | Strasser et al. | 385/48 |
| 5,953,141 A | 9/1999 | Liu et al. | |
| 5,982,791 A | 11/1999 | Sorin et al. | 372/25 |
| 6,160,616 A | 12/2000 | Ohtomo et al. | 356/247 |
| 6,163,392 A | 12/2000 | Condict et al. | 359/124 |
| 6,169,616 B1 | 1/2001 | Cao | 359/130 |
| 6,195,186 B1 * | 2/2001 | Asahi | 398/5 |
| 6,333,799 B1 * | 12/2001 | Bala et al. | 398/9 |
| 6,631,018 B1 * | 10/2003 | Milton et al. | 398/59 |
| 6,684,005 B1 * | 1/2004 | Egnell et al. | 385/24 |

FOREIGN PATENT DOCUMENTS

| | | |
|---|---|---|
| WO | 9826531 A1 | 6/1998 |
| WO | WO 99/65165 | 12/1999 |

OTHER PUBLICATIONS

Zhong, IEEE, vol. 1, pp. 556-560 (1997).

Ho et al., Electronics Letters, vol. 34, Issue 10, pp. 947-948 (1998).

Zhao et al., Optical Fiber Communications Conference, vol. 1, pp. 183-185 (1999).

* cited by examiner

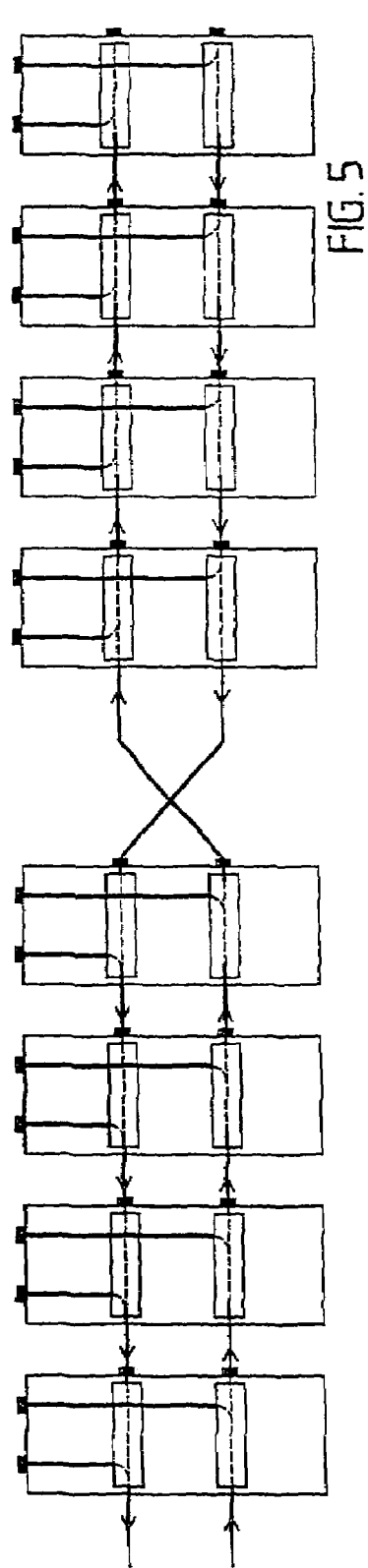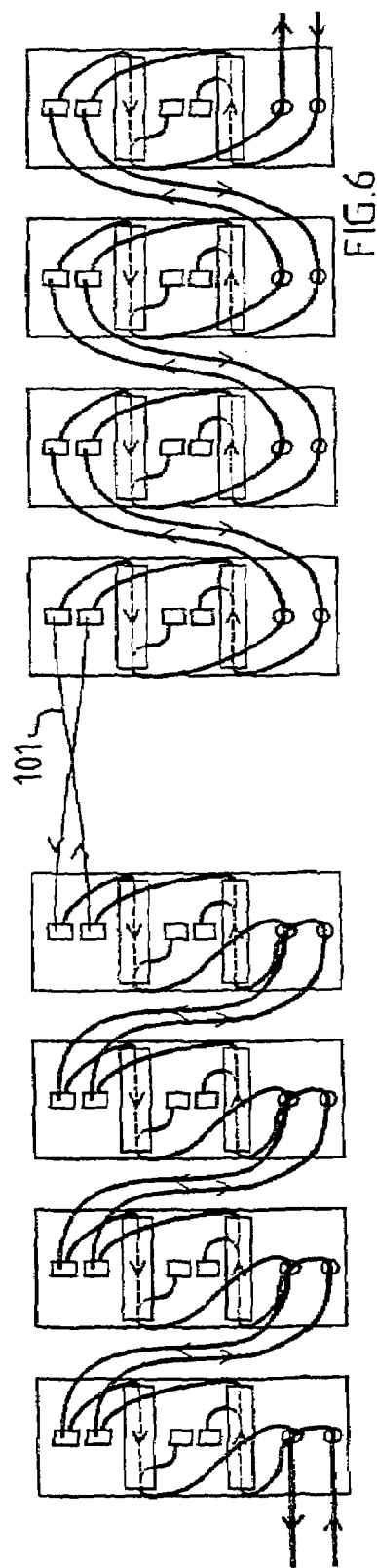

CONNECTION OF ON AN ADD/DROP NODE

This application is the national phase under 35 U.S.C. § 371 of PCT International Application No. PCT/SE00/01877 which has an International filing date of Sep. 27, 2000, which designated the United States of America.

TECHNICAL FIELD

The present invention relates to an add/drop node of an optical WDM-network, in particular to the connection of an add/drop node to two paths of the network carrying light in opposite directions, and to a network including such an add/drop node.

BACKGROUND

Optical networks using WDM (Wavelength Division Multiplexing) are now proposed to be built more and more. In such networks a plurality of add/drop nodes are connected and simple devices should be provided for connecting the nodes to the network. For example, when an existing node is expanded to be capable of receiving and transmitting in another wavelength band the manual work required therefor should be minimized. An optical network having add/drop nodes is for example disclosed in U.S. Pat. No. 5,754,545.

SUMMARY OF THE INVENTION

It is an object of the invention to provide an add/drop node for an optical WDM-network having a simple way of connecting the node to circulating fiber paths of the network.

It is another object of the invention to provide an optical WDM-network having an add/drop node built to allow a simple way of connecting the node to parallel fiber paths of the network.

Thus generally, an add/drop node is intended to be connected in an optical WDM-network. The network has two parallel fiber paths allowing light of a plurality of wavelength channels to propagate in opposite directions. The add/drop node comprises two add/drop modules for each of the channels. All the modules are identically constructed and most of their connections are very similar to each other allowing a simple mounting and connection of the components of the node and also a simple rearrangement for changing wavelength channels and for adding/deleting wavelength channels used in the network. Each module comprises an add device for adding light to a first one of the paths and a drop device for deflecting a portion of light from a second one of the paths. The add device and the drop device of a module are enclosed by a housing, the housing of the modules being placed in a single row, at the sides of each other and for instance mounted in a rack. A first fixed connector is attached to the housing of a module for connection in the first path and to an optical fiber which extends freely from the housing and has a first free connector at its free end to be attached to the fixed connector of a neighbouring add/drop module for continuing the first path through the considered add/drop module to the neighbouring module. In the same way a second fixed connector is attached to the housing for connection in the second path and to a second optical fiber which extends freely from the house and has a second free connector at its free end to be attached to the fixed second connector of a neighbouring add/drop module for continuing the second path through the considered add/drop module to the neighbouring module.

More particularly, in the add/drop node two add/drop modules are provided for each of the channels of light propagating in the network. Each add/drop module has an add device or light combiner for adding light to one of the two optical fiber paths and it has also a drop device for deflecting a portion of light from the other optical fiber path. Furthermore, all the add/drop modules have the same construction. The add/drop modules can then be arranged in two sets, so that the add/drop modules of a first set have their add devices connected in one fiber path and their drop devices connected in the other fiber path. Also, the add/drop modules of the second set then have their add devices connected in the other fiber path and their drop devices connected in said one fiber path.

In at least each of the two sets the add/drop modules are placed at the sides of each other and then inner modules and two end modules are obtained in each set. For two adjacent or neighbouring add/drop modules of a set an output of the add device in a first one of the two adjacent add/drop modules can be connected to an input of the add device in a second one of the two adjacent add/drop modules. In the same way, for two adjacent add/drop modules an output of the drop device in a first one of the two adjacent add/drop modules can be connected to an input of the drop device in a second one of the two adjacent add/drop modules. For one of the end add/drop modules comprised in a first set its drop device can have an output connected to an input of the add device of one of the two end add/drop modules in the other, second set. Similarly, for said one end add/drop module of the second set its drop device can have an output connected to an input of the add device of said one end add/drop module in the first set.

BRIEF DESCRIPTION OF THE DRAWINGS

The invention will now be described by way of a non-limiting embodiment with reference to the accompanying drawings, in which FIG. 5 is a block diagram schematically showing the connections of add/drop modules of the nodes, FIG. 6 is a block diagram showing in a somewhat more realistic way the connections of add/drop modules of the nodes.

DETAILED DESCRIPTION

Figure 1:
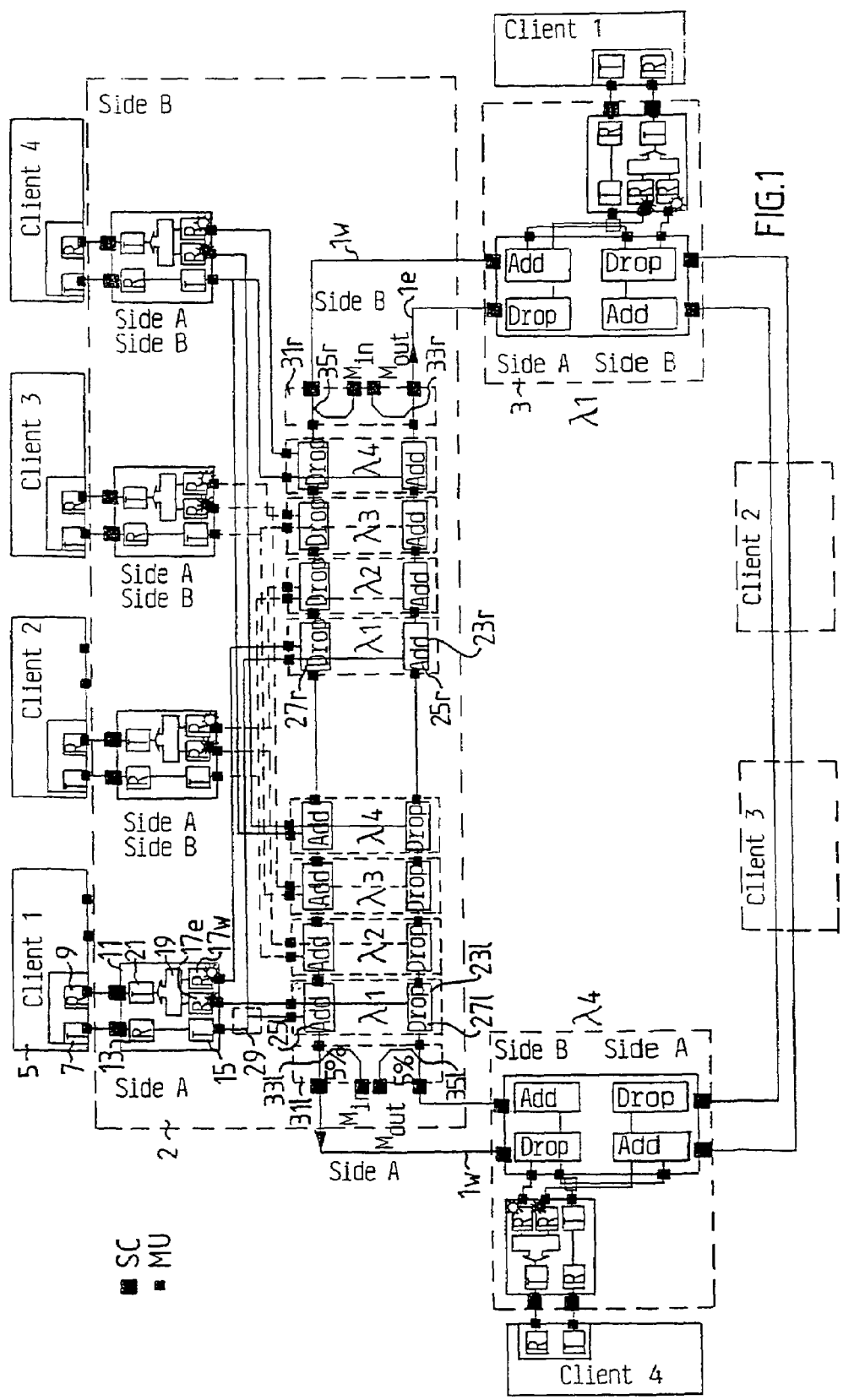
FIG. 1 is a block diagram of an optical network having a ring architecture and a hub node and four client nodes.

In FIG. 1 a block diagram of an optical fiber WDM-network having a ring configuration is shown. Thus two optical fiber paths 1*e*, 1*w* pass in a basically uninterrupted way all around the network, one fiber path 1*e* carrying light propagating in the east direction and the other fiber path 1*w* carrying light propagating in the west direction.

The network includes a hub node 2 and in the embodiment shown four client nodes 3, called Client 1, 2, 3 and 4, the nodes being connected to the two basic fiber paths 1*e*, 1*w* for adding and dropping light from the fibers. A client node n receives and transmits information in a narrow wavelength band, also called channel, around a single wavelength $\lambda_n$, n=1, 2, .... The hub node 2 can receive and transmit information in all channels, i.e., on all wavelengths $\lambda_n$, n=1, 2, .... For each client node 3, the hub node 2 is connected to an electrical client portion 5. Such an electrical client portion 5 comprises an electrooptic converter or optical transmitter 7 converting electrical signals to optical signals and an optoelectric converter or optical receiver 9 for receiving optical signals converting the received signals to electrical signals. The electrical client portion 5 is through optical fibers connected to an optical client portion 11 in the hub node 2. The optical client portion 11 has optical connectors for receiving the optical fibers extending from the respective electrical client portion.

The optical client portion 11 comprises an optical receiver-transmitter combination 13, 15 for transmission, the receiver 13 of the combination receiving the light signal from the transmitter 7 of the electrical client portion 5 providing its output signal to the transmitter 15 of the pair, which provides a well-defined light signal in the narrow wavelength band used for the respective client. The optical transmitter 15 is coupled to an optical connector for providing its output signal on an optical fiber to add/drop modules as will be described hereinafter.

The optical client portion 11 also comprises an optical receiver-transmitter combination for receiving, the combination comprising two optical receivers 17e, 17w connected to receive light from the add/drop modules through optical fibers and optical connectors, one receiver 17e being used for receiving light propagating in the network, in the appropriate fiber, in an east direction and another receiver 17w being used for receiving light propagating in the west direction in the ring network. The outputs of the two optical receivers 17e, 17w are connected to inputs of a combining element or optical multiplexer 19 which combines the received signals to provide them to a transmitter 21, the output terminal of which is through the respective connector and a fiber length connected to the receiver 9 in the electrical client portion 5.

Furthermore the hub node 2 includes a plurality of add/drop modules 23l, 23r one pair of such add/drop modules being provided for each client node 3 in the network. In such a pair one module 23l is adapted to transmit in a left direction from the hub node and to receive from the same left direction. The other module 23r of a pair is adapted to transmit in and to receive from the right direction from the hub node. Each add/drop module is connected in the two ring-shaped fiber paths 1e, 1w of the network. The left add/drop module 23l comprises an add device 25l connected in the fiber ring path 1w and an drop device 27l connected in the other fiber ring path 1e. The add device 25l is, through fiber sections, a 50/50 splitting coupler 29 (only one is shown in the drawing) and the respective connector connected to the transmitter 15 in the optical client portion 11 for the appropriate client node. The drop device 27l, is through a fiber and the respective connector, connected to the receiver 17e in the optical client portion 11 for the same client node.

In the same way, the right add/drop module 23r in the pair comprises an add device 25r connected in the fiber ring path 1e and an drop device 27r connected in the other fiber ring path 1w. The add device 25r is, through fiber sections, a respective splitting coupler 29 and the respective connector, connected to the transmitter 15 in the optical client portion 11 for the client node. The drop device 27r is, through a fiber and the respective connector, connected to the receiver 17w in the optical client portion 11 for the client node.

The add devices 25l, 25r contain some coupling or combining element and, if required, a notch filter blocking light of the wavelength band or channel for which the add/drop module is designed. The optional filter will then stop only light of the wavelength band propagating in the respective fiber ring path 1w, 1e before light of the same wavelength band is added in the combining element. The drop devices 27l, 27r contain in the same way some splitting and filtering element for tapping off only light of the wavelength band or channel for which the add/drop module is designed.

All add/drop nodes 23l, 23r have the same basic design and functions and can thus all be given the same physical shape as discussed hereinafter.

The two fiber ring paths 1e, 1w are connected to the hub node 2 on a left side of the hub node and on a right side of the node. On each such side a monitor module 31l, 31r can be arranged which is thus connected in the two ring paths. The monitor module 31l, 31r comprises an add coupler 33l, 33r for adding, e.g., some control signal and a tap 35l, 35r for tapping off some small portion of the incoming light power (e.g., 1%.).

Figure 2:
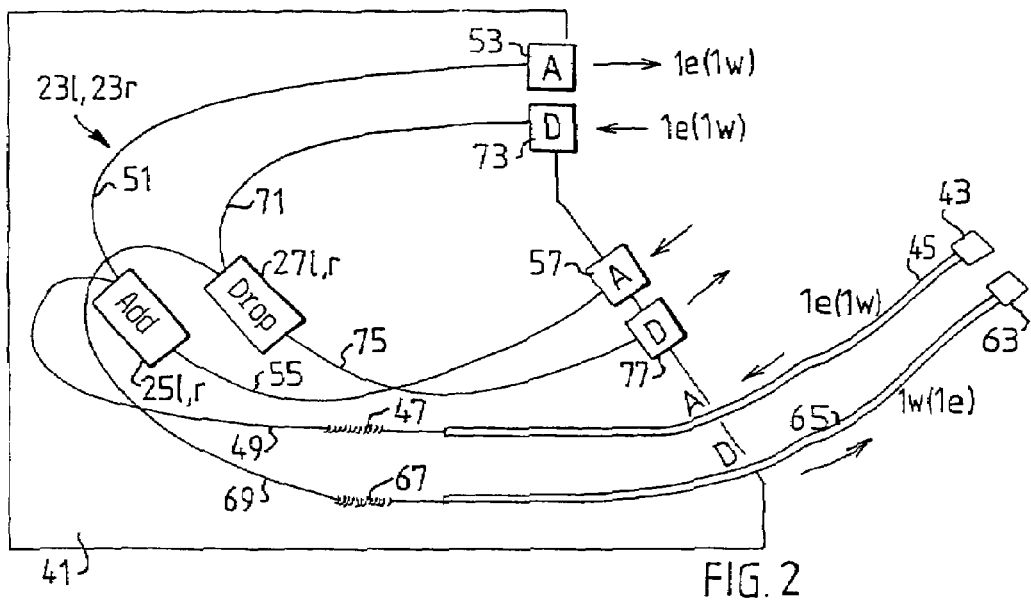
FIG. 2 is a schematic picture of the connection lines of an add/drop module used in the nodes of the network.

The schematic diagram of FIG. 2 illustrates the connections of the add/drop modules 23l, 23r. Each module comprises a housing indicated at 41. Light from one (1e) of two ring paths of the network enters the module at a connector 43 attached to a fiber section 45 extending loosely outside the housing 41. The fiber section 45 has a thick protective sleeve which extends inside the housing to a weld section 47 which splices an end of an optical fiber 49 having a standard thin protective sleeve to the fiber section 45. The optical fiber section 49 is, at its opposite ends connected to one of the two inputs of the add device 25l, 25r. The output of the add device is connected to a fiber section 51, which in turn is connected to a connector 53 attached to the housing 41. The connector 53 should be connected in the same ring path 1e as the input connector 43. The other input of the add device is, through a fiber section 55, connected to a connector 57 which is attached to the housing 41. The connector 43 thus receives light from the ring path 1e to the fiber 45, through the weld 47, the fiber section 49, the add device 25l, 25r, the fiber section 51 and to the connector 53. The output connector 53 lets the light continue along the ring path 1e. Light from an optical client portion 11 enters the module at the connector 57, continues through the fiber 55 to the add device 25l, 25r, in which the light is added to that propagating along the ring path 1e.

Furthermore, in the module 23l, 23r there is a set of connected fiber sections, which is parallel to that described and is connected in the other ring path 1w of the network, but in which instead of the add device 25r, 25l, the drop device 27l, 27r is connected. Thus a connector 63 is to be connected to the other ring path and is attached to an end of a well-protected fiber section 65 extending partly outside the housing 41; the other end being the fiber section 65 connected through a weld section 67 to a standard fiber section piece 69. This fiber section is in turn connected to one of the two outputs of the drop device 27l, 27r. The input of the drop device is connected to a fiber section 71 which receives light from a connector 73 attached to the housing 41. The connector 73 should be connected in the respective ring path 1w. The other output of the drop device 27l, 27r is connected to an end of a fiber section 75 which has its other end connected to a connector 77 attached to the housing 41. This connector 77 is, through a fiber, attached to a respective receiver 17w (17e) in the optical client portion 11. Light from the ring path 1w enters the module at the connector 73, continues through the fiber 71, the drop device 27l, 27r, the fiber 69, the weld section 67, the thick fiber 65 to the loose connector 63, which in turn is connected in the respective ring path 1w of the network. Some light of a specific wavelength band is tapped off in the drop device 27l, 27r and continues through the fiber 75 to the connector 77 and therefrom to the respective optical client portion 11.

Figure 3:
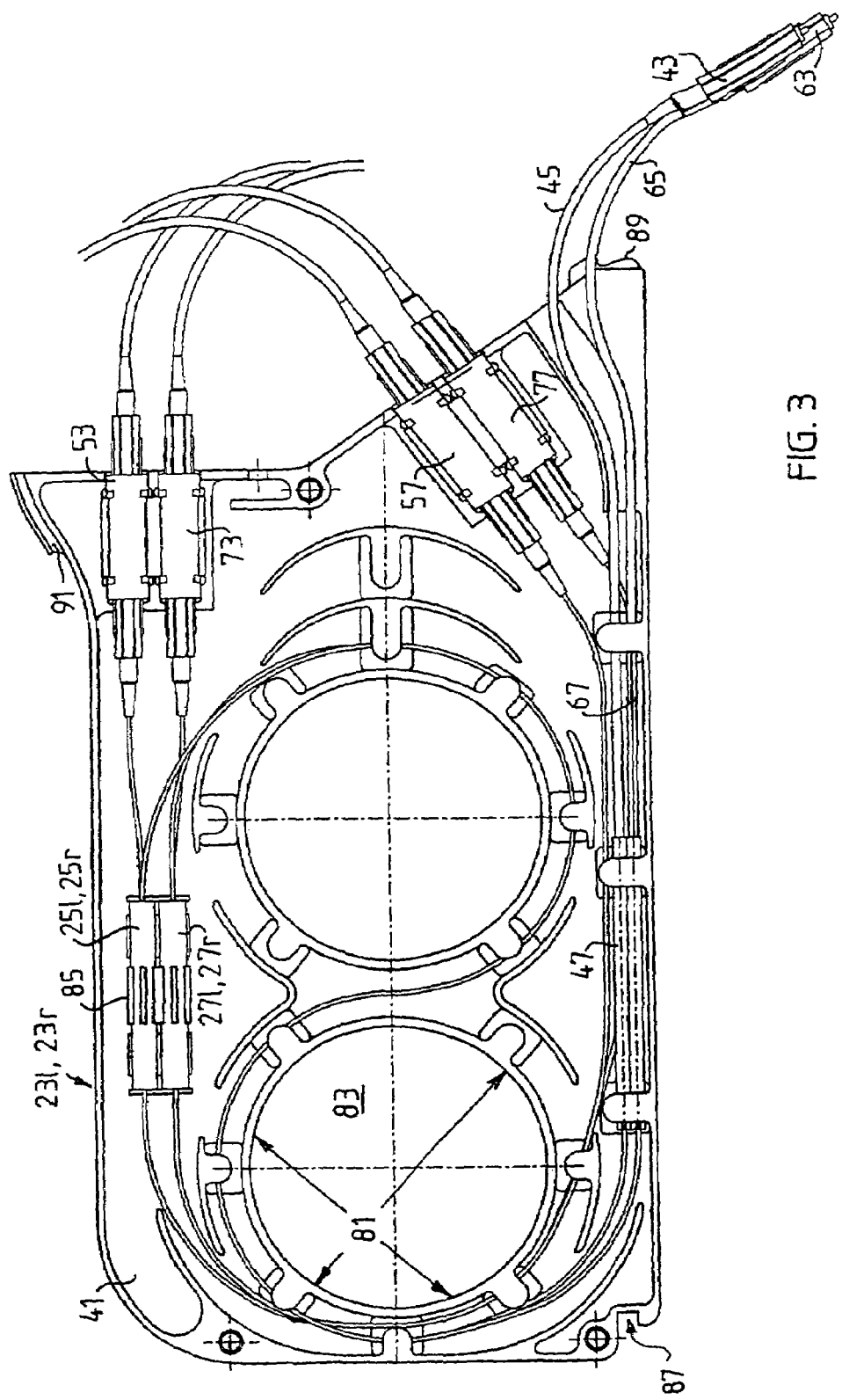
FIG. 3 is a view from the side of the inside of a housing of an add/drop module.
Figure 7:
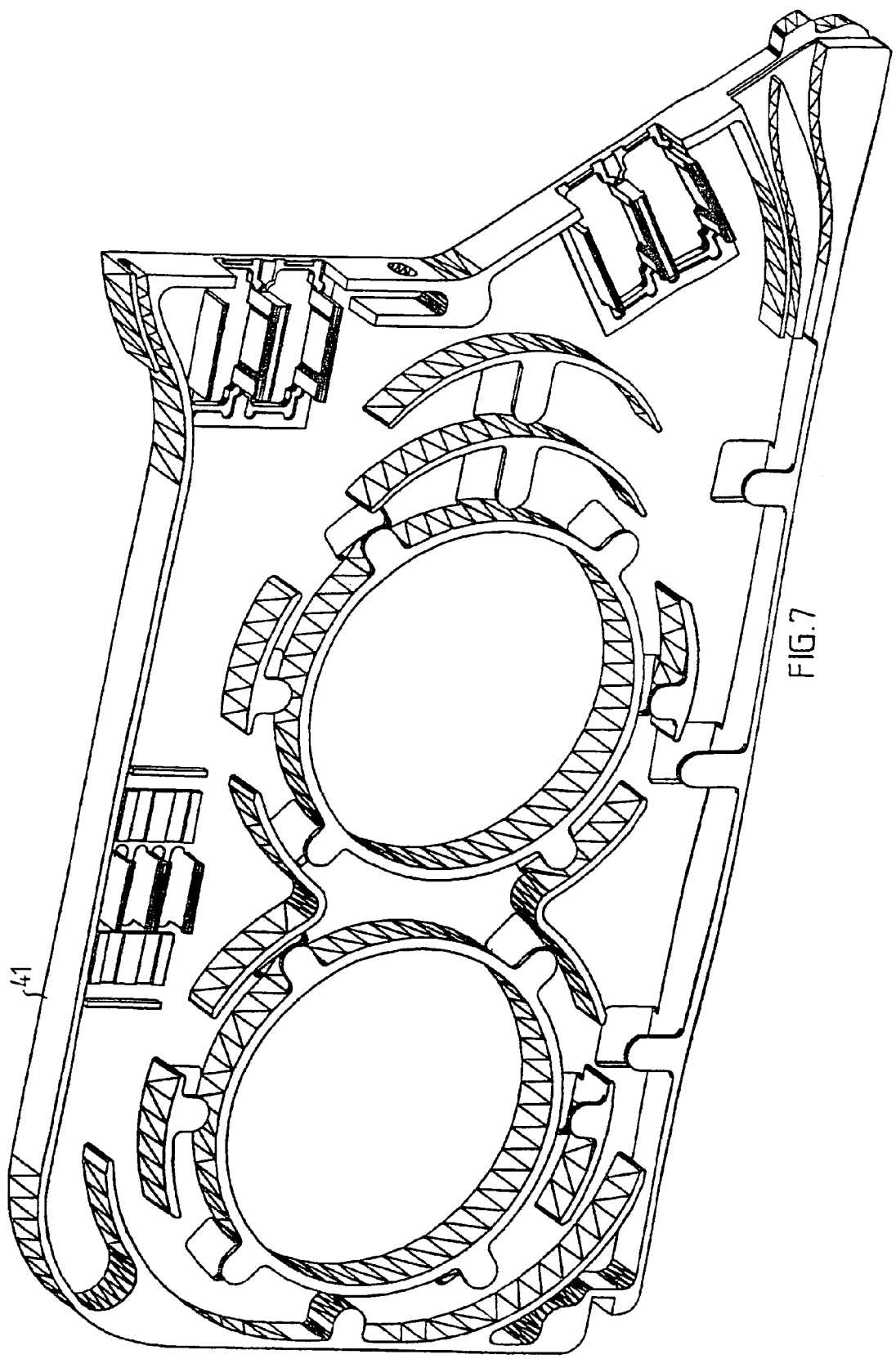
FIG. 7 is a perspective view showing the inside of a housing of an add/drop module.

The physical layout of the interior of an add/drop module housing 41 is shown in the side view of FIG. 3. The module housing 41 comprises a substantially flat portion from which various walls stand out. The walls all have the same height and connect to a basically flat lid (not shown) which is mounted over the housing 41. The walls form two circular winding cores 81 having a sufficiently large diameter, e.g. about 50 mm, allowing that fibers can be wound around them and not being subjected to too small bending radii (too severe curvatures). The two winding cores 81 are placed at some distance from each other to allow the fibers to pass therebetween. By arranging two such cores the fiber sections used can be allowed to have some extra length allowing them to be comfortably handled and to again be spliced to the devices in the case of fiber breaks or bad splices. Additionally, the direction of the fiber sections at the places where they are connected to the devices can be selected to avoid bends which are too small, by placing the fibers, for instance, in a configuration similar to the figure eight around the two cores 81. Inside the walls forming the winding cores through-holes 83 may be arranged for an easy handling of the module housing. The add devices 25l, 25r and the drop devices 27l, 27r can be attached between outstanding walls 85 at the top of the housing.

At the lower edge of the housing 41 devices are provided for attaching the housing to a rack, the attaching devices comprising a notch 87 at the rear side and a snap device 89 at the front side. A channel 91 is formed at the front top side of the house 41 to allow fibers connecting the module to the associated optical client portion to be held therein.

Figure 4:
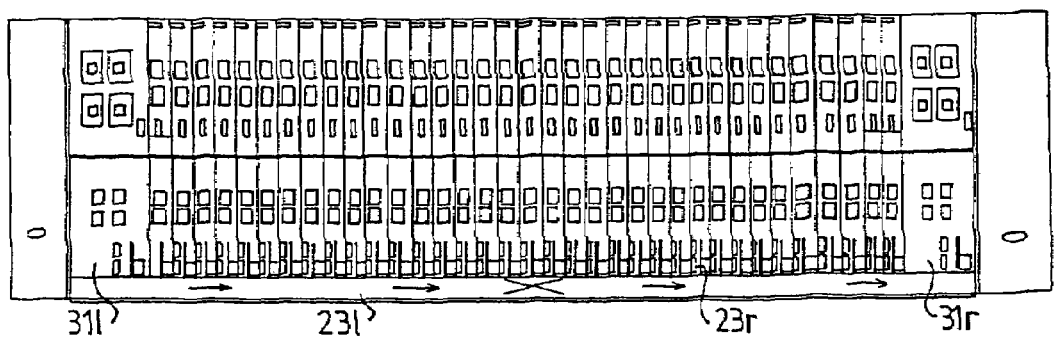
FIG. 4 is a front view of a plurality of add/drop modules mounted in a rack.

FIG. 4 is a front view of the add/drop modules 23l, 23r and the monitor modules 31l, 31r mounted in a rack, the loosely extending fiber pieces 45, 65 not being visible in this figure. By comparing FIG. 4 to FIG. 1 it is seen that the connection of all left add/drop modules 23l is as indicated in FIG. 3, the extending fiber sections 45, 65 being inserted in the mating connectors 53, 73 in the adjacent module at the left side of the respective module. This connection is illustrated in the schematic view of FIG. 6; see also FIG. 5. Thus, in FIG. 5 the same basic connection as in FIG. 1 is illustrated, where, in the right modules 23r the add devices and the drop devices have changed places with each other. Then a cross coupling must be made between the group of left modules 23l and the group of right modules 23r and between the right group and the right monitor module 31r as compared to the straight schematic connection of modules shown in FIG. 1.

The same connection of the modules is illustrated in FIG. 6 in which the connections between the add/drop modules using loosely extending fiber sections 45, 65 is shown. From this figure it appears clearly that all add/drop modules 23l, 23r can have an identical construction, only the tapping-off devices and filters being specific to the channel for which the respective module is designed. The cross coupling is made in the middle of the assembly of add/drop modules, between the left and right modules. Such a cross connection can be made by connecting the loose fiber sections 101 having optical connectors at each end in a cross configuration or a particular cross connecting module can be used. Such a module has the same exterior design as the other modules but has inside just the optical fibers connected cross-wise.

In FIG. 4 a multitude of add/drop modules 23l, 23r are illustrated. However, only a portion of the add/drop modules may be active ones, constructed as described above. At the side of the active modules dummy modules are inserted having the same exterior layout but without the connectors and the loosely extending fibers. The dummy modules are used for just filling up the space between the active modules and the monitor modules.

The two monitor modules 31l, 31r both have the same exterior connectors and interior devices as each other but have not the same interior connection lines. The necessary connections appear clearly from FIG. 1.

The client nodes 3 in the network have the same basic design as the hub node 2 but are designed to receive and transmit in only one wavelength band. The same kind of add/drop modules as described above can for example be used.

In other network ring architectures the client nodes can receive and transmit in more than one wavelength band. Then the client nodes can have the same structure as the hub node 2.

What is claimed is:

1. An add/drop node to be connected in an optical WDM-network, the network including two optical fiber paths for letting light of a plurality of channels propagate in opposite directions in the network, characterized by two add/drop modules for each of the channels, each add/drop module comprising an add device for adding light to a first one of the two optical fiber paths and a drop device for deflecting a portion of light from a second one of the two optical fiber paths different from the first one and all add/drop modules having the same construction, and in that the add/drop modules are arranged in two sets, the add/drop modules of a first one of the two sets having their add devices connected in the first one of the two optical fiber paths and their drop devices connected in the second one of the two optical fiber paths and the add/drop modules of a second one of the two sets different from the first one having their add devices connected in the second one of the two optical fiber paths and their drop devices connected in the first one of the two optical fiber paths.

2. An add/drop node according to claim 1, characterized in that in each of the two sets the add/drop modules are placed at the sides of each other, and that for two adjacent add/drop modules an output of the add device in a first one of the two adjacent add/drop modules is connected to an input of the add device in a second one of the two adjacent add/drop modules.

3. An add/drop node according to claim 2, characterized in that in each of the two sets the add/drop modules are placed at the sides of each other to form inner add/drop modules and two end add/drop modules in each set, the end add/drop modules having an add/drop module of the set on only one side, and that for one of the two end add/drop modules of a first one of the two sets its drop device has an output connected to an input of the add device of one of the two end add/drop modules in a second one of the two sets and that for said one of the two end add/drop modules of the second one of the two sets its drop device has an output connected to an input of the add device of said one of the two end add/drop modules in the first one of the two sets.

4. An add/drop node according to claim 2, characterized in that each add/drop module comprises a housing enclosing the add device and the drop device of the add/drop module, a first fixed connector attached to the housing for connection in the first one of the two optical fiber paths and a first optical fiber extending freely from the housing and having a first free connector at its free end to be attached to the fixed connector of a neighboring add/drop module for continuing the first path through the considered add/drop module to the neighboring module, and a second fixed connector attached to the housing for connection in the second one of the two optical fiber paths and a second optical fiber extending freely from the housing and having a second free connector at its free end to be attached to the fixed second connector of a neighboring add/drop module for continuing the second path through the considered add/drop module to the neighboring module.

5. An add/drop node according to claim 1, characterized in that in each of the two sets the add/drop modules are placed at the sides of each other, and that for two adjacent add/drop modules an output of the drop device in a first one of the two adjacent add/drop modules is connected to an input of the drop device in a second one of the two adjacent add/drop modules.

6. An add/drop node according to claim 5, characterized in that in each of the two sets the add/drop modules are placed at the sides of each other to form inner add/drop modules and two end add/drop modules in each set, the end add/drop modules having an add/drop module of the set on only one side, and that for one of the two end add/drop modules of a first one of the two sets its drop device has an output connected to an input of the add device of one of the two end add/drop modules in a second one of the two sets and that for said one of the two end add/drop modules of the second one of the two sets its drop device has an output connected to an input of the add device of said one of the two end add/drop modules in the first one of the two sets.

7. An add/drop node according to claim 5, characterized in that each add/drop module comprises a housing enclosing the add device and the drop device of the add/drop module, a first fixed connector attached to the housing for connection in the first one of the two optical fiber paths and a first optical fiber extending freely from the housing and having a first free connector at its free end to be attached to the fixed connector of a neighboring add/drop module for containing the first path through the considered add/drop module to the neighboring module, and a second fixed connector attached to the housing for connection in the second one of the two optical fiber paths and a second optical fiber extending freely from the housing and having a second free connector at its free end to be attached to the fixed second connector of a neighboring add/drop module for continuing the second path through the considered add/drop module to the neighboring module.

8. An add/drop node according to claim 1, characterized in that in each of the two sets the add/drop modules are placed at the sides of each other to form inner add/drop modules and two end add/drop modules in each set, the end add/drop modules having an add/drop module of the set on only one side, and that for one of the two end add/drop modules of a first one of the two sets its drop device has an output connected to an input of the add device of one of the two end add/drop modules in a second one of the two sets and that for said one of the two end add/drop modules of the second one of the two sets its drop device has an output connected to an input of the add device of said one of the two end add/drop modules in the first one of the two sets.

9. An add/drop node according to claim 8, characterized in that each add/drop module comprises a housing enclosing the add device and the drop device of the add/drop module, a first fixed connector attached to the housing for connection in the first one of the two optical fiber paths and a first optical fiber extending freely from the housing and having a first free connector at its free end to be attached to the fixed connector of a neighboring add/drop module for continuing the first path through the considered add/drop module to the neighboring module, and a second fixed connector attached to the housing for connection in the second one of the two optical fiber paths and a second optical fiber extending freely from the housing and having a second free connector at its free end to be attached to the fixed second connector of a neighboring add/drop module for continuing the second path through the considered add/drop module to the neighboring module.

10. An add/drop node according to claim 1, characterized in that each add/drop module comprises a housing enclosing the add device and the drop device of the add/drop module, a first fixed connector attached to the housing for connection in the first one of the two optical fiber paths and a first optical fiber extending freely from the housing and having a first free connector at its free end to be attached to the fixed connector of a neighboring add/drop module for continuing the first path through the considered add/drop module to the neighboring module, and a second fixed connector attached to the housing for connection in the second one of the two optical fiber paths and a second optical fiber extending freely from the housing and having a second free connector at its free end to be attached to the fixed second connector of a neighboring add/drop module for continuing the second path through the considered add/drop module to the neighboring module.

11. An add/drop node according to claim 10, characterized in that the house includes two winding cores around which excessive fiber lengths connecting devices and connectors of the add/drop module can be wound.

* * * * *